United States Patent
Tani et al.

(10) Patent No.: US 7,974,519 B2
(45) Date of Patent: Jul. 5, 2011

(54) OPTICAL DISC RECORDING/REPRODUCING APPARATUS

(75) Inventors: Hironori Tani, Osaka (JP); Mitsuharu Osaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 944 days.

(21) Appl. No.: 11/905,729

(22) Filed: Oct. 3, 2007

(65) Prior Publication Data

US 2008/0131082 A1    Jun. 5, 2008

(30) Foreign Application Priority Data

Dec. 4, 2006  (JP) ................................. 2006-326934

(51) Int. Cl.
| | |
|---|---|
| H04N 9/80 | (2006.01) |
| H04N 5/92 | (2006.01) |
| H04N 5/89 | (2006.01) |
| H04N 5/84 | (2006.01) |
| G11B 5/09 | (2006.01) |
| G11B 15/52 | (2006.01) |
| G11B 19/02 | (2006.01) |
| G11B 20/10 | (2006.01) |

(52) U.S. Cl. ........ 386/248; 386/287; 386/326; 386/332; 386/334; 386/336; 369/47.1

(58) Field of Classification Search .................. 386/248, 386/287, 326, 332, 334, 336; 369/47.1
See application file for complete search history.

(56) References Cited

U.S. PATENT DOCUMENTS

| | | | | | |
|---|---|---|---|---|---|
| 2005/0152688 | A1* | 7/2005 | Chen et al. | ..................... | 386/125 |
| 2005/0232609 | A1* | 10/2005 | Eckleder | ....................... | 386/125 |
| 2007/0065105 | A1* | 3/2007 | Chao et al. | ....................... | 386/95 |
| 2007/0230299 | A1* | 10/2007 | De Haan et al. | .............. | 369/47.1 |
| 2008/0019676 | A1* | 1/2008 | Ho et al. | ........................ | 386/125 |
| 2009/0269041 | A1* | 10/2009 | De Haan | ....................... | 386/126 |

FOREIGN PATENT DOCUMENTS

| | | |
|---|---|---|
| JP | 2002-312940 A | 10/2002 |
| JP | 2006-107622 | 4/2006 |

* cited by examiner

Primary Examiner — Thai Tran
Assistant Examiner — Daquan Zhao
(74) Attorney, Agent, or Firm — Morgan, Lewis & Bockius LLP

(57) ABSTRACT

When information is recorded on an optical disc of DVD+R type, a latest RSAT is recorded upon completion of recording of one title. When recording of the latest RSAT fails, previous RSAT address information that indicates an address in which a previous RSAT is recorded is stored in a lead-in area of the optical disc. When an optical disc is loaded for reproduction, it is checked if the previous RSAT address information is present in the lead-in area. If it is present, the previous RSAT address information is obtained. If the latest RSAT is not found in a predetermined location but the previous RSAT address information is present, reproduction from the optical disc of DVD+R type is started by using the previous RSAT.

4 Claims, 4 Drawing Sheets

OPTICAL DISC RECORDING/REPRODUCING APPARATUS

This application is based on Japanese Patent Application No. 2006-326934 filed on Dec. 4, 2006, the contents of which are hereby incorporated by reference.

BACKGROUND OF THE INVENTION

1. Field of the Invention

The present invention relates to an optical disc recording/reproducing apparatus for recording information to an optical disc and reproducing information recorded on the optical disc, and particularly relates to recording control and reproduction control for an optical disc of DVD+R type.

2. Description of Related Art

In recent years, there has been a wide spread of DVDs (Digital Versatile Disc) as an optical disc capable of recording a large amount of video/audio data that of movies or the like. As these DVDs, various types are known such as a DVD-ROM containing information that is pre-recorded by a manufacturer and can not be rewritten by a user, a DVD-R or a DVD+R that allows the user to record information thereon only once, and a DVD-RW, a DVD+RW, or a DVD-RAM that allows the user to rewrite information thereon repeatedly. Information recorded on these DVDs can be reproduced by optical disc reproducing apparatuses (DVD players) or optical disc recording/reproducing apparatuses (DVD recorders), and information can be recorded on a DVD-R, a DVD+R, a DVD-RW, a DVD+RW, and a DVD-RAM by using optical disc recording/reproducing apparatuses (DVD recorders).

Here, among these types of optical discs, a description will be given of the conventional recording control and reproducing control for the DVD+R optical disk.

First, a description will be given of the recording control for the DVD+R optical disc performed by a conventional optical disk recording apparatus. When a DVD+R optical disc is inserted in the apparatus and loaded therein (mounting process for reading out disc information), the optical disc is detected as a DVD+R optical disc. Then, recording on the DVD+R optical disc begins in +VR mode in response to recording key operation on a remote control unit or the preset time to begin the recording when the programmed recording (programmed video recording) is activated.

In this way, the recording on the optical disc begins, and the information to be recorded first is then recorded as a title T1 in the data area of the optical disc. When the title T1 has been recorded, an RSAT (Reserved Space Allocation Table) that indicates title information of the title T1 is recorded after the title T1. Then, information to be recorded next is recorded as a title T2 in the data area of the optical disc. When the title T2 has been recorded, an RSAT that indicates title information of the title T2 is recorded after the title T2. Further, information to be recorded next is recorded as a title T3 in the data area of the optical disc. When the title T3 has been recorded, an RSAT that indicates title information of the title T3 is recorded after the title T3. Thereafter, the recording will be repeated in a similar manner.

Next, a description will be given of the reproduction control for the DVD+R optical disc performed by a conventional optical disc recording apparatus.

When a DVD+R optical disc is inserted in the apparatus and loaded therein, the optical disc is detected as a DVD+R optical disc. Then, a list of titles recorded on the optical disc is displayed on a display apparatus as a reproduction list. When the user selects and decides a desired title to be reproduced from among the titles in the reproduction list by operating a remote control unit, the optical disc recording/reproducing apparatus reads out the RSAT for the selected title, analyzes the file system, the control information, and the like, and reproduces the selected title.

The conventional recording/reproducing apparatus records a title on the DVD+R optical disc under the recording control as described above or reproduces a title recorded on the DVD+R optical disc under the reproduction control as described above. However, if the recording of an RSAT for a specific title is failed after the title itself has been successfully recorded on the DVD optical disc, the specific title certainly can not be reproduced and, further, all RSATs that were recorded prior to the recording of the specific title can not be obtained, thereby making the reproduction of all titles impossible because there is no way to search the locations of the RSATs recorded in the past.

It is to be noted that, when the recording of an RSAT is failed, it is possible to find the RSATs recorded in the past. However, to do so, it is necessary to repeat many times the process of reading out data sequentially in predetermined sector units starting from the inner track side of the optical disc and the process of comparing the data on a sector-by-sector or ECC-by-ECC basis to find if the read-out data is the data of the title information that is searched for. Therefore, an enormous amount of time is required, which makes the reproduction of all titles impossible in reality.

According to a conventional technique described in JP-A-2002-312940, positional information of an area to which data is written is updated and held in a memory every time recording is performed. Also, the positional information held in the memory and the actual positional information of an area of a disc medium on which data is written are compared. When it is determined that the two sets of data are not identical, then the positional information in the memory is recorded to a write-once read-many-times type disc medium, so that recovery is made possible even if recording of the recording management area fails. However, according to this conventional technique, when recording of a specific title on a DVD+R optical disc is completed but recording of the RSAT for this specific title is failed, all RSATs recorded in the past can not be retrieved. In this case, this conventional technique does not solve a problem, i.e., all of the titles can not be reproduced, which is the problem specific to the DVD+R optical disc.

According to a conventional technique described in JP-A-2006-107622, recording zones are sequentially formed from the lead-in area side to the lead-out area side on the DVD-R disc. If an ECC error occurs when video information is recorded in a zone after a completed zone, the readable and normal latest log information selected from between log information 1 and log information 2 is moved to a zone after the last zone. However, according to this conventional technique, when recording of a specific title on a DVD+R optical disc is completed but recording of the RSAT for the specific title is failed, all RSATs recorded in the past can not be retrieved. In this case, this conventional technique does not solve a problem, i.e., all of the titles can not be reproduced, which is the problem specific to the DVD+R optical disc.

SUMMARY OF THE INVENTION

The present invention is made for solving the problem described above, and an object of the present invention is to provide an optical recording/reproducing apparatus capable of designating an RSAT in a short period of time and reviving a title recorded in the past without searching an entire disc even when recording of an RSAT fails.

To achieve the above object, an optical disc recording/reproducing apparatus according to the present invention includes: a recording controller for: recording a latest RSAT (Reserved Space Allocation Table) upon completion of recording of one title if an optical disc inserted into the apparatus is an optical disc of DVD+R type on which data is to be recorded; and storing, in a lead-in area of the optical disc, previous RSAT address information indicating an address in which a previous RSAT is recorded, when recording of the latest RSAT fails; and a reproduction controller for: determining whether previous RSAT address information is present in a lead-in area of the optical disc when an optical disc of DVD+R type is loaded; obtaining the previous RSAT address information if the previous RSAT address information is present; and starting reproduction from the optical disc of DVD+R type by using a latest RSAT if the previous RSAT address information is not present but the latest RSAT is found in a predetermined location or if the previous RSAT address information is present and the latest RSAT is found in the predetermined location, or starting reproduction from the optical disc of DVD+R type by using a previous RSAT if the latest RSAT is not present in the predetermined location but the previous RSAT address information is present.

According to the present invention, in an optical disc of DVD+R type, the previous RSAT address information that indicates an address where the previous RSAT is recorded is stored in the lead-in area when the recording of the latest RSAT fails. As a result, if the recording of the latest RSAT fails, the location of the previous RSAT can be easily found. With this arrangement, it is possible to designate the RSAT without searching the entire areas of the disc, retrieve the title that was previously recorded, and avoid a situation in which the reproduction is made entirely impossible.

DETAILED DESCRIPTION OF PREFERRED EMBODIMENTS

Figure 1:
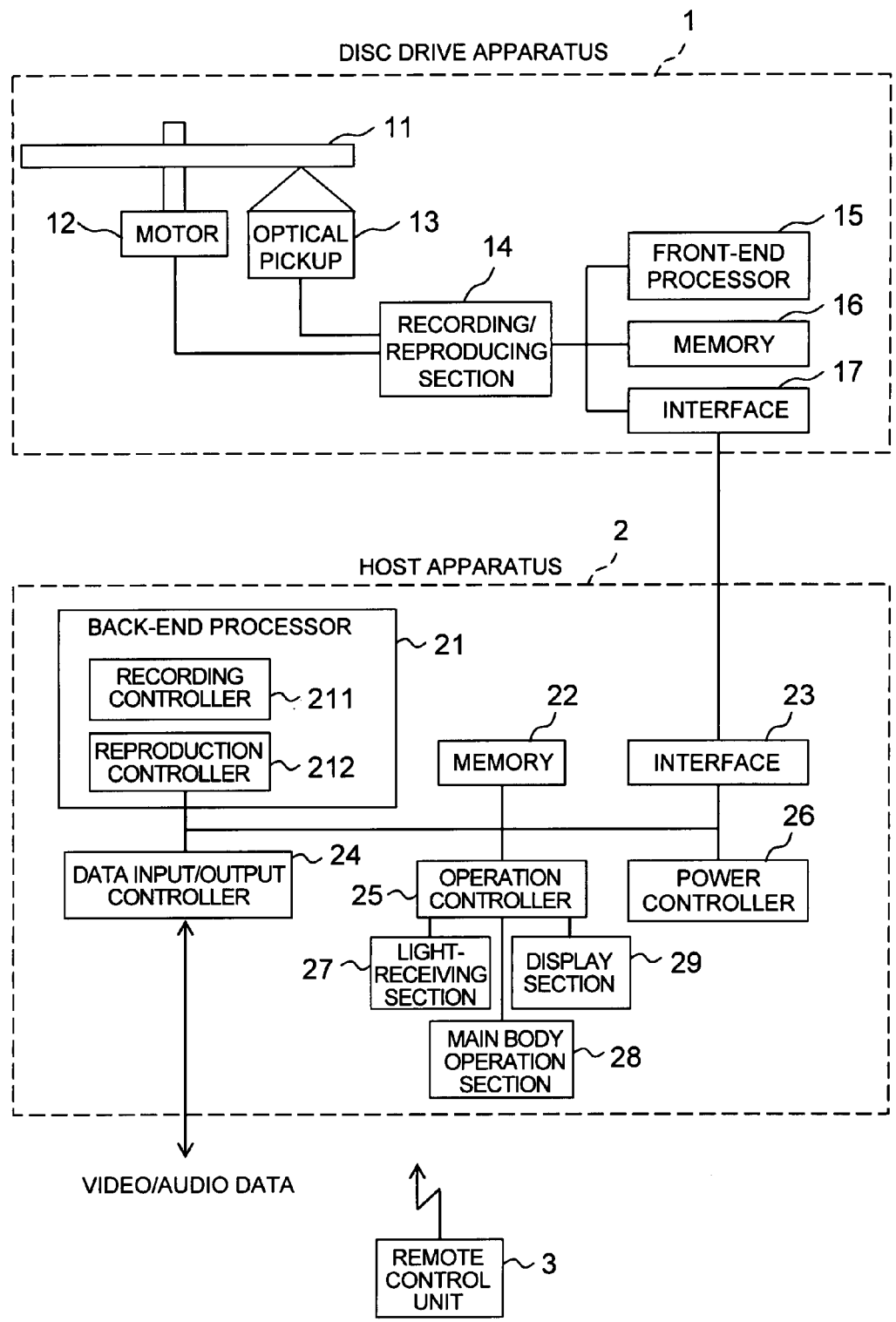
FIG. 1 is a block diagram showing the structure of an optical disc recording/reproducing apparatus of one embodiment of the present invention.

Hereinafter an embodiment of the present invention will be described with reference to the accompanying drawings. FIG. 1 is a block diagram showing the structure of an optical disc recording/reproducing apparatus of one embodiment of the present invention. The optical disc recording/reproducing apparatus comprises a disc drive apparatus 1 and a host apparatus 2 thereof.

The disc drive apparatus has: a spindle motor 12 for rotating an inserted optical disc (DVD or CD) 11; an optical pickup 13 for optically writing and reading information to and from the optical disc 11; a recording/reproducing section 14 for recording information on the optical disc 11 and reproducing information recorded on the optical disc 11 by driving the spindle motor 12 and the optical pickup 13; a front-end processor 15 for controlling each constituent element in this apparatus; a memory 16 consisting of an area for memorizing programs and data required for processing by the front-end processor 15, a buffer area for data to be recorded and data to be reproduced, an area used as an intermediate buffer when converting data into such data that can be used by the recording/reproducing section 14, and the like; and an interface 17 for transmitting and receiving data to and from the host apparatus 2.

The host apparatus 2 has: a back-end processor 21 for controlling each constituent element in this apparatus; a memory 22 for storing data required for the processing by the back-end processor 21; an interface 23 for transmitting and receiving data to and from the disc drive apparatus 1; a data input/output controller 24 for controlling the input and output of data externally and writing and reading data to and from a buffer area in the memory 22; an operation controller 25 for issuing operation instructions to the host apparatus 2, displaying the contents of operation, and the like; a power controller 26 for monitoring voltage fluctuations, determining that a power failure occurs when the voltage drops below a predetermined voltage, and, thereafter, performing power recovery when the voltage recovers to and above the predetermined voltage; a light-receiving section 27 for receiving a light signal for operation such as infrared rays from the remote control unit 3 that has a plurality of different operation keys and converting the light signal into the electric signal as an operation signal to be fed out to the operation controller 25; an operation section 28 of the main body provided on the front panel of the optical recording/reproducing apparatus and having a plurality of basic operation keys; and a display section 29 provided on the front panel to display the contents of operation and the operation status.

The host apparatus 2 receives video/audio data from an unillustrated TV tuner or an external terminal through the data input/output controller 24 and records the data on the optical disc 11 by using the disc drive apparatus 1. The host apparatus 2 is further configured to output the video/audio signal read from the optical disc 11 and reproduced by the disc drive apparatus 1 to a monitor apparatus such as an unillustrated television receiver. To be specific, the disc drive apparatus 1 and the host apparatus 2 together function as an optical disc recording/reproducing apparatus by allowing the back-end processor 21 to execute a program memorized in advance in the memory 22. The memory 22 is consisting of a ROM area in which the program is memorized, a buffer area to be used for compressing and decompressing the video data, a RAM area in which variables required for the execution of the program are temporarily stored, and a non-volatile RAM area backed up by an internal battery or the like for holding data required for unattended programmed recording and variables during a power failure.

The back-end processor 21 is provided with a recording controller 211 which has RSAT recording means and RSAT address information storing means both of which serve to function when the inserted optical disc 11 is a DVD+R optical disc and data is recorded on this DVD+R optical disc. The RSAT recording means records, in an area after the title on completion of recording of one title, a file system which indicates that the recording mode is +VR mode or the like and an RSAT which indicates title information such as the control information for controlling the title recorded on the optical disc. The RSAT address information storing means stores previous RSAT address information which indicates, when the recording of the current RSAT fails, an address where a previous RSAT is recorded.

The back-end processor 21 is further provided with a reproduction controller 212 which comprises: RSAT address information storage checking means for checking, when the DVD+R optical disc is inserted and loaded, whether or not the previous RSAT address information is stored in the lead-in area; RSAT address information obtaining means for retrieving the previous RSAT address information and storing it in the memory 22 when it is determined that the previous RSAT address information is present; latest RSAT searching means for searching whether or not the latest RSAT is stored in the predetermined location when it is determined that the previous RSAT address information is not stored or after the previous RSAT address information is obtained; first reproduction control means for starting reproduction by analyzing the file system and the control information required for performing the reproduction operation from the DVD+R optical disc by using the latest RSAT when the latest RSAT is found in the predetermined location; RSAT address information presence/absence determination means for determining whether or not the obtained previous RSAT address information exists when the latest RSAT is not found in the predetermined location; and second reproduction control means for starting reproduction by analyzing the file system and the control information required for performing the reproduction operation from the DVD+R optical disc by using the previous RSAT if it is determined that the obtained previous RSAT address information exists.

Figure 2:
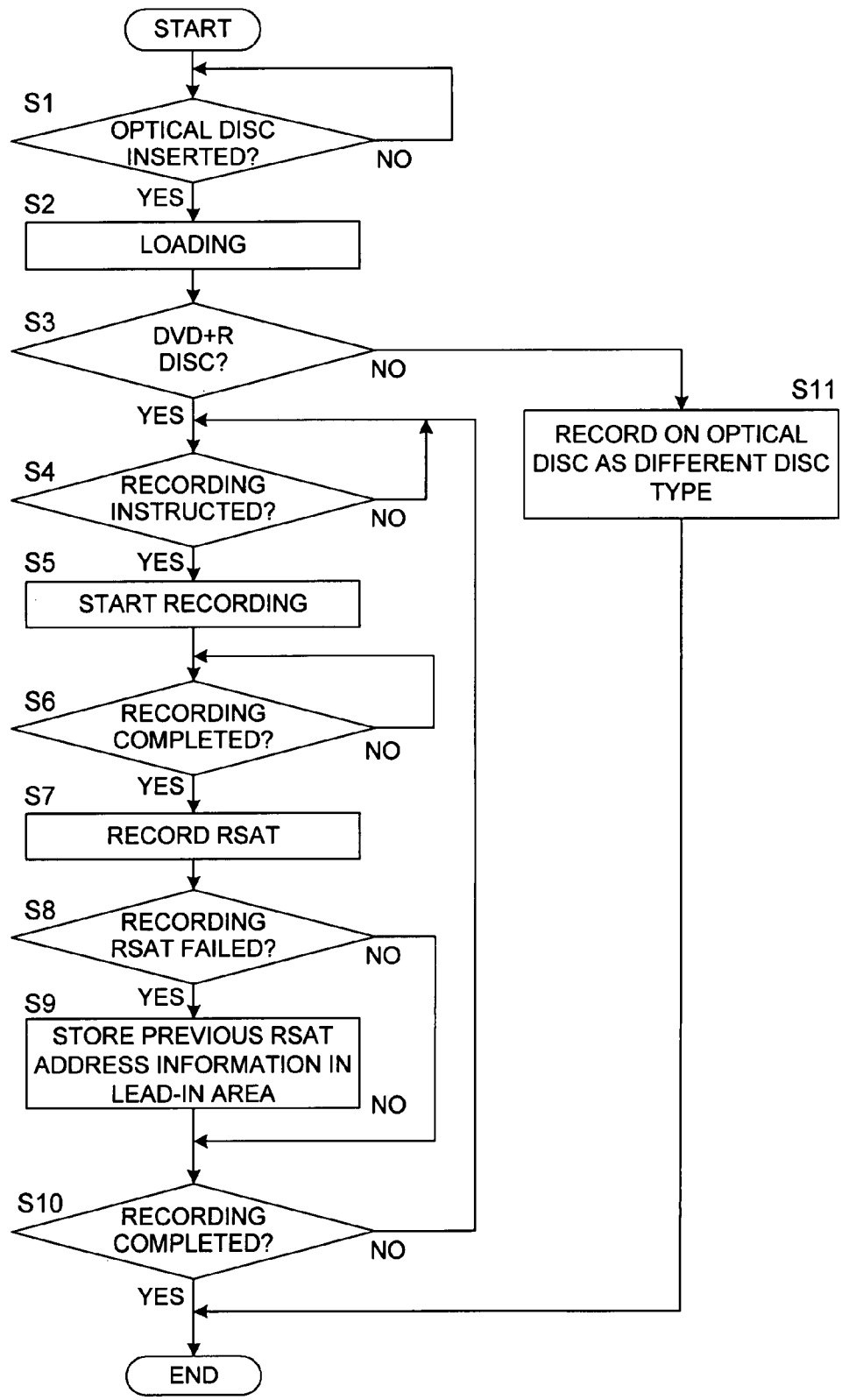
FIG. 2 is a flowchart for explaining the recording control for a DVD+R optical disc.
Figure 3:
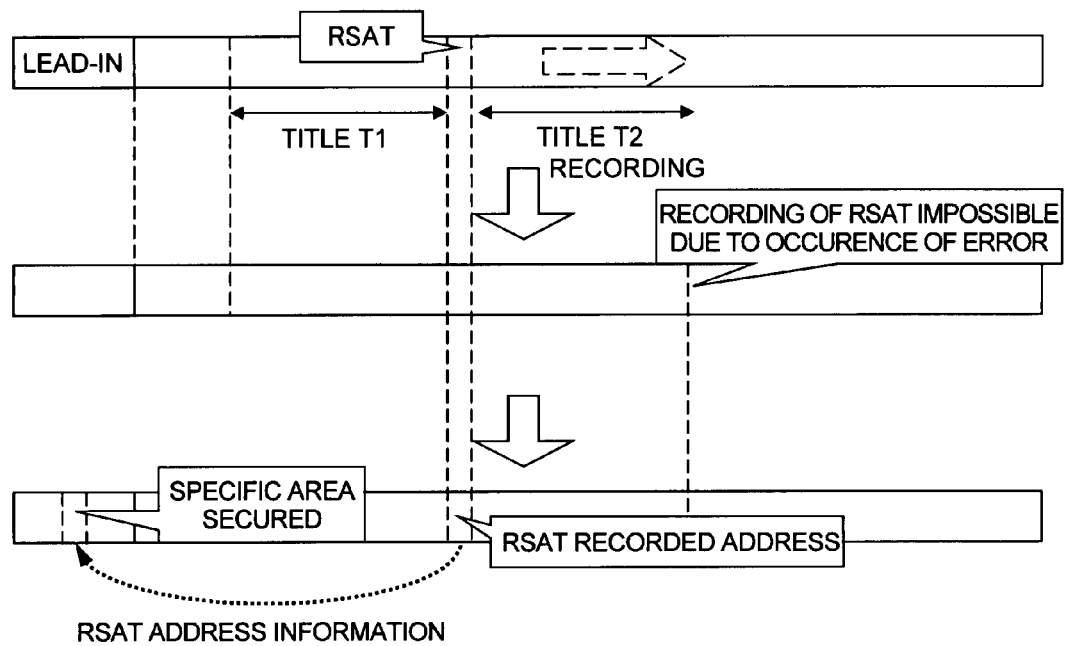
FIG. 3 is a data structure on the DVD+R optical disc for explaining a recording process of RSAT address information in the recording control.

FIG. 2 is a flowchart for explaining the recording control for a DVD+R optical disc according to this embodiment. FIG. 3 is a data structure on the DVD+R optical disc for explaining a recording process of RSAT address information in the recording control according to this embodiment. A description will be given of the recording control for the DVD+R optical disc with reference to FIGS. 1-3.

When the user operates a tray opening/closing key on the remote control unit 3, the back-end processor 21 of the host apparatus 2 issues a tray-open command to the front-end processor 15 of the disc drive apparatus 1. With this command, the front-end processor 15 drives an unillustrated tray drive mechanism to open the tray. Then, when the user places the optical disc 11 onto the tray and operates the tray opening/closing key again, the back-end processor 21 issues a tray-close command to the front-end processor 15. With this command, the front-end processor 15 drives the tray drive mechanism to close the tray and detects the insertion of the optical disc 11 (Step S1).

Next, the front-end processor 15 rotates the optical disc 11 for a short period of time by driving the spindle motor 12, performs the loading (mount operation for reading disc information) (Step S2), and determines from the disc information whether the inserted optical disc 11 is a DVD+R optical disc or not (Step S3). If it is determined that the optical disc 11 is not a DVD+R optical disc and, at the same time, when the recording is instructed, the recording control for a different type of optical disc is performed (Step S11). However, if it is determined that the optical disc 11 is a DVD+R optical disc, the following processing is performed.

To be specific, the back-end processor 21 detects that there has been a recording instruction issued when a recording key on the remote control unit 3 is operated or by responding to a recording start time in the programmed recording mode (programmed video recording) (Step S4) and issues a recording command to the front-end processor 15. With this command, the front-end processor 15 operates the recording/reproducing section 14 to record in the +VR mode and starts recording on the optical disc 11 of DVD+R type the video/audio data that is inputted through the data input/output controller 24, the interface 23, and the interface 17 (Step S5).

Here, the video/audio data to be recorded on the optical disc 11 is, for example, as shown in FIG. 3, recorded as the title T1 in the data area of the optical disc 11, and the front-end processor 15 detects that the title T1 has been recorded (Step S6). Then, in response to this, the RSAT recording means of the recording controller 211 of the back-end processor 21 issues an RSAT recording command to the front-end processor 15. With this command, the front-end processor 15 controls the recording/reproducing section 14 so as to record, after the title T1 recorded in the data area of the optical disc 11, the RSAT (refer to FIG. 3) that indicates the title information of the title T1 (Step S7). After the recording of the RSAT has been successfully completed (Step S8) and the title T1 has been recorded, the process is completed unless there is no other data that should be recorded.

Next, as shown in FIG. 3, a description will be given of the recording control when the title T2 is recorded after the title T1 on the optical disc 11 of DVD+R type. It is to be assumed that the optical disc 11 of DVD+R type has been inserted into the apparatus. Therefore, the process from Step S4 will be repeated.

The back-end processor 21 detects, by responding to the operation of the recording key on the remote control unit 3 or the recording start time in the programmed recording mode (programmed video recording), detects that there is a recording instruction (Step S4) and issues a recording command to the front-end processor 15 (Step S5). With this command, the front-end processor 15 allows the recording/reproducing section 14 to operate for recording so as to start recording, on the optical disc 11 of DVD+R type, the video/audio data that is inputted through the data input/output controller 24, the interface 23, and the interface 17 (Step S5).

Here, the video/audio data to be recorded on the optical disc 11 is recorded, for example, as the title T2 in the data area of the optical disc 11 as shown in FIG. 3. When the front-end processor 15 detects that the title T2 has been recorded (Step S6), in response to this, the RSAT recording means of the recording controller 211 of the back-end processor 21 issues an RSAT recording command to the front-end processor 15. With this command, the front-end processor controls the recording/reproducing section 14 to record an RSAT (refer to FIG. 3) that indicates the title information of the title T2 after the title T2 that has been recorded in the data area of the optical disc 11 (Step S7). However, when the recording of the RSAT fails (Step S8), this failure in recording is notified to the back-end processor 21.

In response to this notification of the failure in recording, the RSAT address information storing means of the back-end processor 21 issues an RSAT address information storing command that is a dedicated command used when the recording of the RSAT fails, for storing in the lead-in area of the optical disc 11 the previous RSAT address information indicating the address where the previous RSAT (RSAT of the title T1) is recorded. Then, the front-end processor 15 that receives the RSAT address information storing command controls the recording/reproducing section 14 to store the previous RSAT address information in the lead-in area of the optical disc 11 (Step S9). In the lead-in area, parameters required for accessing the optical disc 11 are also stored. In an unused area thereof, the previous RSAT address information is stored.

As described above, the previous RSAT address information is stored in the lead-in area of the optical disc 11. This makes it possible for the back-end processor 21 to find the location of the data on the optical disc 11 where the previous RSAT is recorded by relying on the previous RSAT address information that is stored in the lead-in area of the optical disc 11 even when the recording of the latest RSAT for the current title fails, and thereby it becomes possible to prevent all titles from not being reproduced.

Figure 4:
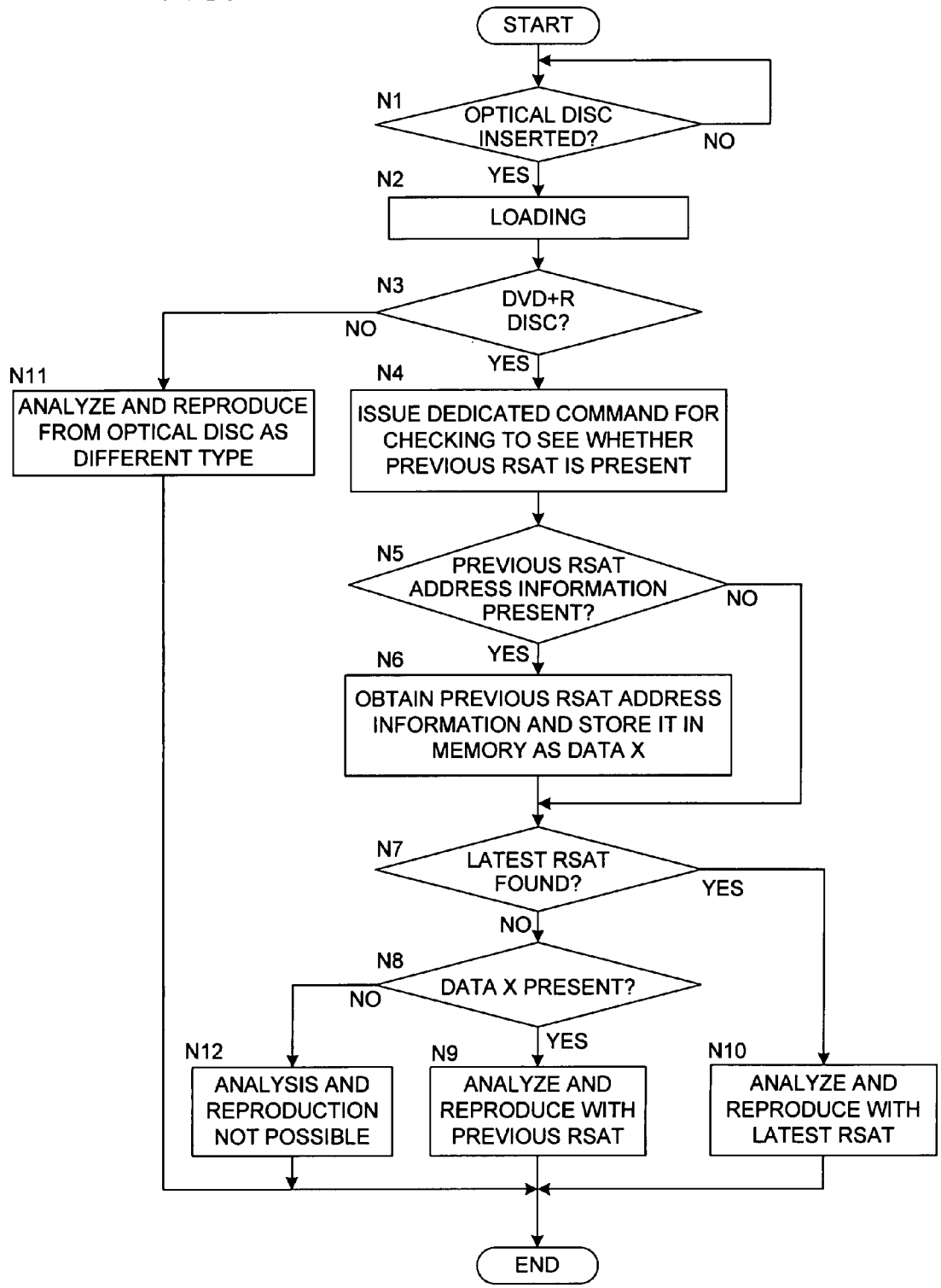
FIG. 4 is a flowchart for explaining the reproduction control for the DVD+R optical disc.

FIG. 4 is a flowchart for explaining the reproduction control for the DVD+R optical disc according to this embodiment. A description will be given of the reproduction control for the DVD+R optical disc with reference to this flow chart and FIGS. 1 and 3.

When the user operates the tray opening/closing key on the remote control unit 3, the back-end processor 21 of the host apparatus 2 issues a tray-open command to the front-end processor 15 of the disc drive apparatus 1. With this command, the front-end processor 15 drives the tray drive mechanism to open the tray. Then, when the user places the optical disc 11 onto the tray and operates the tray opening/closing key again, the back-end processor 21 issues a tray-close command to the front-end processor 15. With this command, the front-end processor 15 drives the tray drive mechanism to close the tray and detects the insertion of the optical disc 11 (Step N1).

Next, the front-end processor 15 rotates the optical disc 11 for a short period of time by driving the spindle motor 12, performs the loading (mount operation for reading disc information) (Step N2), and determines from the disc information whether the inserted optical disc 11 is a DVD+R optical disc or not (Step N3). If it is determined that the optical disc 11 is not a DVD+R optical disc, the front-end processor 15 analyzes the disc and reproduces from the disc as a different type of disc (Step N11). However, if it is determined that the optical disc 11 is a DVD+R optical disc, the following processing is performed.

To be specific, the RSAT address information storage checking means of the reproduction controller 212 of the back-end processor 21 issues an RSAT address information storage checking command that is a dedicated command used for checking whether previous RSAT address information was stored at the time of the previous loading of the disc in the lead-in area of the optical disc 11 (Step N4). Then, it is determined whether or not the previous RSAT address information is stored in the lead-in area of the optical disc 11 (Step N5). Upon receiving the dedicated RSAT address information storage checking command from the back-end processor 21, the front-end processor 15 controls the recording/reproducing section 14 to access the lead-in area of the optical disc 11 and check to see if the previous RSAT address information is stored in the lead-in area. If the previous RSAT address information is stored therein, this result is notified to the back-end processor 21.

In response to this notification, the RSAT address information storage checking means of the reproduction controller 212 of the back-end processor 21 finally determines that the previous RSAT address information is present (Step N5). Then, the RSAT address information obtaining means of the reproduction controller 212 of the back-end processor 21 obtains the previous RSAT address information from the optical disc 11 through the recording/reproducing section 14 and stores the previous RSAT address information in the memory 22 as data X which indicates a positional address in the data area of the optical disc 11 (Step N6).

However, if it is determined that the previous RSAT address information is not present (Step N5) or after the previous RSAT address information is obtained (Step N6), the latest RSAT searching means of the reproduction controller 212 searches to see whether or not there is a latest RSAT in the predetermined location (Step N7). If the latest RSAT is found in the predetermined location, the first reproduction control means of the reproduction controller 212 analyzes the file system and the control information required for performing the reproduction operation from the optical disc 11 of DVD+R type by using the latest RSAT (Step N10) and issues a reproduction start command. In response to this command, the front-end processor 15 controls the recording/reproducing section 14 to start reproduction of the title from the optical disc 11 by using the latest RSAT.

If the latest RSAT is not found in the predetermined location (Step N7), the RSAT address information presence/absence determination means determines whether or not the previous RSAT address information (data X) obtained as described previously is present in the memory 22 (Step N8). If it is determined that the previous RSAT address information (data X) is not present, it becomes impossible to analyze the file system and the control information and perform reproduction (Step N12), and the process ends. If it is determined that the previous RSAT address information (data X) is present in the memory 22, the second reproduction control means of the reproduction controller 212 analyzes the file system and the control information by using the previous RSAT (Step N9) and issues a reproduction start command to start the reproduction. In response to this command, the front-end processor 15 controls the recording/reproducing section 14 to reproduce the title from the optical disc 11 by using the previous RSAT.

As described above, according to this embodiment, in an optical disc of DVD+R type, the previous RSAT address information that indicates an address where the previous RSAT is recorded is stored in the lead-in area when the recording of the latest RSAT fails. As a result, if the recording of the latest RSAT fails, the location of the previous RSAT can be easily found. With this arrangement, it is possible to designate the RSAT without searching the entire areas of the disc, retrieve the title that was previously recorded, and avoid a situation in which the reproduction is made entirely impossible.

What is claimed is:

1. An optical disc recording/reproducing apparatus for recording and reproducing information to and from an optical disc, the apparatus comprising:
   a recording controller for:
      recording a latest RSAT (Reserved Space Allocation Table) upon completion of recording of one title if an optical disc inserted into the apparatus is an optical disc of DVD+R type on which data is to be recorded; and
      storing, in a lead-in area of the optical disc, previous RSAT address information indicating an address in which a previous RSAT is recorded, when recording of the latest RSAT fails; and
   a reproduction controller for:
      determining whether previous RSAT address information is present in a lead-in area of the optical disc when an optical disc of DVD+R type is loaded;
      obtaining the previous RSAT address information if the previous RSAT address information is present; and
      starting reproduction from the optical disc of DVD+R type by using a latest RSAT if the previous RSAT address information is not present but the latest RSAT is found in a predetermined location or if the previous RSAT address information is present and the latest RSAT is found in the predetermined location, or starting reproduction from the optical disc of DVD+R type by using a previous RSAT if the latest RSAT is not present in the predetermined location but the previous RSAT address information is present.

2. The optical disc recording/reproducing apparatus according to claim 1,
   wherein the recording controller comprises:

RSAT recording means for recording the latest RSAT; and

RSAT address information storing means for storing, in the lead-in area of the optical disc, the previous RSAT address information indicating an address in which the previous RSAT is recorded, when recording of the latest RSAT fails, and wherein the reproduction controller comprises:

RSAT address information storage checking means for determining whether or not the previous RSAT address information is present in the lead-in area of the optical disc;

RSAT address information obtaining means for obtaining the previous RSAT address information if it is determined that the previous RSAT address information is present;

latest RSAT searching means for searching to see whether or not the latest RSAT is present in a predetermined location if it is determined that the previous RSAT address information is not present or when the previous RSAT address information is obtained;

first reproduction control means that analyzes a file system and control information required for starting reproduction operation for the optical disc of DVD+R type and starts reproduction by using the latest RSAT if the latest RSAT is found in the predetermined location;

RSAT address information presence/absence determination means for determining whether or not the previous RSAT address information is present if the latest RSAT is not found in the predetermined location; and second reproduction control means that analyzes the file system and the control information required for starting reproduction operation for the optical disc of DVD+R type and starts reproduction by using the previous RSAT if it is determined that the previous RSAT address information is present.

3. The optical disc recording/reproducing apparatus according to claim 2, wherein the reproduction controller does not perform reproduction from the optical disc of DVD+R type if the latest RSAT is not found in the predetermined location and the previous RSAT address information is not present.

4. The optical disc recording/reproducing apparatus according to claim 1, wherein the reproduction controller does not perform reproduction from the optical disc of DVD+R type if the latest RSAT is not found in the predetermined location and the previous RSAT address information is not present.

* * * * *